United States Patent
Tandiono et al.

(10) Patent No.: US 10,133,821 B2
(45) Date of Patent: Nov. 20, 2018

(54) SEARCH RESULT PREFETCHING OF VOICE QUERIES

(71) Applicant: Google LLC, Mountain View, CA (US)

(72) Inventors: Christopher Bo Tandiono, Fremont, CA (US); Michael Buchanan, Mountain View, CA (US); Nathan David Howard, Mountain View, CA (US); Ishai Rabinovitz, Haifa (IL)

(73) Assignee: Google LLC, Mountain View, CA (US)

( * ) Notice: Subject to any disclaimer, the term of this patent is extended or adjusted under 35 U.S.C. 154(b) by 326 days.

(21) Appl. No.: 14/988,990

(22) Filed: Jan. 6, 2016

(65) Prior Publication Data

US 2017/0193111 A1    Jul. 6, 2017

(51) Int. Cl.
*G06F 17/30* (2006.01)
*G10L 15/26* (2006.01)

(52) U.S. Cl.
CPC .. *G06F 17/30864* (2013.01); *G06F 17/30401* (2013.01); *G06F 17/30554* (2013.01); *G10L 15/26* (2013.01)

(58) Field of Classification Search
CPC ......... G06F 17/30864; G06F 17/30401; G06F 17/30554; G10L 15/26
USPC ...................................................... 707/706
See application file for complete search history.

(56) References Cited

U.S. PATENT DOCUMENTS

| 7,461,059 B2 * | 12/2008 | Richardson | G06F 17/3064 |
| 7,565,157 B1 * | 7/2009 | Ortega | H04W 4/02 |
| | | | 455/414.3 |
| 7,729,904 B2 * | 6/2010 | Bennett | G06F 17/27 |
| | | | 704/215 |

(Continued)

FOREIGN PATENT DOCUMENTS

| EP | 2-706-470 | * 3/2014 | ............. G06F 17/30 |
| EP | 2937860 | 10/2015 | |

(Continued)

OTHER PUBLICATIONS

Hawking, David, et al., "An enterprise search paradigm based on extended query auto-completion. Do we still need search and navigation?", ADCS '13, Brisbane, QLD, Australia, Dec. 5-6, 2013, pp. 17-25.*

(Continued)

*Primary Examiner* — Robert Stevens
(74) *Attorney, Agent, or Firm* — Fish & Richardson P.C.

(57) ABSTRACT

Methods, systems, and apparatus, including computer programs encoded on a computer storage medium, for receiving audio data encoding an utterance; obtaining an intermediate transcription of the utterance; before a final transcription of the utterance is obtained: i) determining that the intermediate transcription of the utterance is associated with a previously received search query, ii) obtaining one or more results that are identified as responsive to the previously received search query, and iii) storing one or more of the results; obtaining the final transcription of the utterance; determining that the final transcription of the utterance is also (Continued)

associated with the previously received search query; and in response to determining that the final transcription of the utterance is also associated with the previously received search query, providing the stored one or more results for output.

17 Claims, 5 Drawing Sheets

(56) References Cited

U.S. PATENT DOCUMENTS

| | | | |
|---|---|---|---|
| 7,836,044 B2* | 11/2010 | Kamvar | G06F 17/30646 707/713 |
| 8,260,809 B2* | 9/2012 | Platt | G06F 17/276 707/771 |
| 8,515,752 B1* | 8/2013 | Franz | G10L 15/22 704/236 |
| 8,521,526 B1 | 8/2013 | Lloyd et al. | |
| 8,589,164 B1* | 11/2013 | Mengibar | G10L 15/06 704/10 |
| 8,719,265 B1 | 5/2014 | Bedrax-Weiss et al. | |
| 8,768,700 B1* | 7/2014 | Franz | G10L 15/22 704/236 |
| 9,330,661 B2* | 5/2016 | Mamou | G10L 15/08 |
| 2006/0161541 A1 | 7/2006 | Cencini | |
| 2007/0143262 A1 | 6/2007 | Kasperski | |
| 2009/0006343 A1 | 1/2009 | Platt et al. | |
| 2009/0228274 A1* | 9/2009 | Terrell, II | G10L 15/22 704/235 |
| 2010/0049678 A1 | 2/2010 | Huang et al. | |
| 2010/0235341 A1* | 9/2010 | Bennett | G06F 17/27 707/706 |
| 2011/0145224 A1 | 6/2011 | Bangalore | |
| 2011/0295590 A1* | 12/2011 | Lloyd | G10L 15/065 704/8 |
| 2013/0346078 A1* | 12/2013 | Gruenstein | G10L 15/26 704/235 |
| 2014/0074474 A1* | 3/2014 | Sharifi | G10L 15/265 704/251 |
| 2014/0114661 A1* | 4/2014 | Mengibar | G10L 15/06 704/244 |
| 2014/0136197 A1* | 5/2014 | Mamou | G10L 15/08 704/235 |
| 2014/0288935 A1* | 9/2014 | Lewis | G10L 15/1822 704/254 |

FOREIGN PATENT DOCUMENTS

| | | | | |
|---|---|---|---|---|
| WO | 2013/009405 | | 1/2013 | |
| WO | WO 2014/039106 A1 * | 3/2014 | | G06F 17/30 |

OTHER PUBLICATIONS

Shokouhi, Milad, "Learning to Personalize Query Auto-Completion", SIGIR '13, Dublin, Ireland, Jul. 28-Aug. 1, 2013, pp. 103-112.*

Kokubo, Hiroaki, et al., "Embedded Julius: Continuous Speech Recognition Software for Microprocessor", MMSP 2006, Victoria, BC, Canada, Oct. 3-6, 2006, © IEEE, pp. 378-381.*

International Search Report and Written Opinion in the International Application No. PCT/US2016/062819, dated Jan. 19, 2017, 12 pages.

JP Office Action issued in Japanese Application No. 2018520606, dated Sep. 21, 2018, 13 pages (with English translation).

* cited by examiner

SEARCH RESULT PREFETCHING OF VOICE QUERIES

FIELD

The present specification relates to speech recognition.

BACKGROUND

In general, a search query includes one or more query terms that a user submits to a search engine when the user requests the search engine to execute a search. Among other approaches, a user may enter the query terms of a search query through the context of a voice query, i.e., by speaking the query terms into a microphone of a mobile device. Voice queries may be processed using speech recognition technology.

SUMMARY

According to some innovative aspects of the subject matter described in this specification, concurrently with detecting an utterance provided by a user, preliminary search results are identified based on an intermediate transcription of the utterance. Upon detection of the full utterance, one or more of the preliminary search results can be provided to the user based on a final transcription of the full utterance.

In one example implementation, a user may ask a question about a historic landmark. The user can ask the question "How tall is the Empire State Building?" Before the user speaks the complete question, a mobile device of the user can detect an initial portion of the question and provide the same to a computing system. The computing system can compute an intermediate transcription of this initial portion of the question, e.g., "How tall is," and before computing a final transcription of the full question, identify other past queries that may be associated with the initial portion of the question. For example, the computing system can identify previous queries "How tall is the Empire State Building" and "How tall is the Washington Monument" as associated with the initial portion of the current query. Search results are obtained or re-obtained for the prior queries, and are stored in cache. Upon receipt of the full question "How tall is the Empire State Building," the computing system identifies the previous query "How tall is the Empire State Building" as being associated with the current query. The computing system can then provide the stored search result associated with the previous query "How tall is the Empire State Building" to the user for the current query "How tall is the Empire State Building," without waiting for the full question to be transcribed before generating search results.

Innovative aspects of the subject matter described in this specification may be embodied in methods that include the actions of receiving audio data encoding an utterance; obtaining an intermediate transcription of the utterance; before a final transcription of the utterance is obtained: i) determining that the intermediate transcription of the utterance is associated with a previously received search query, ii) obtaining one or more results that are identified as responsive to the previously received search query, and iii) storing one or more of the results; obtaining the final transcription of the utterance; determining that the final transcription of the utterance is also associated with the previously received search query; and in response to determining that the final transcription of the utterance is also associated with the previously received search query, providing the stored one or more results for output.

Other embodiments of these aspects include corresponding systems, apparatus, and computer programs, configured to perform the actions of the methods, encoded on computer storage devices.

These and other embodiments may each optionally include one or more of the following features. For instance, determining that the intermediate transcription of the utterance is of a threshold size, wherein the intermediate transcription of the utterance is determined to be associated with the previously received search query only after determining that the intermediate transcription is of the threshold size. The intermediate transcription of the utterance is generated by a continuous speech recognizer, and wherein the one or more results are obtained from a search engine. After determining that the intermediate transcription of the utterance is associated with the previously received search query, submitting the previously received search query for re-execution by a search engine. Determining that a location associated with the utterance is associated with a location associated with the previously received search query.

The features further include, for example, determining that the intermediate transcription of the utterance is associated with a previously received search query that was submitted by a same user that is associated with the utterance. Determining that the intermediate transcription of the utterance is associated with a previously received search query that was submitted by a different user than a user that is associated with the utterance. The utterance is a voice command other than a voice query. Determining that the intermediate transcription of the utterance is identical to a portion of the previously received search query. Determining that the intermediate transcription of the utterance is within a threshold similarity to a portion of the previously received search query.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1A:
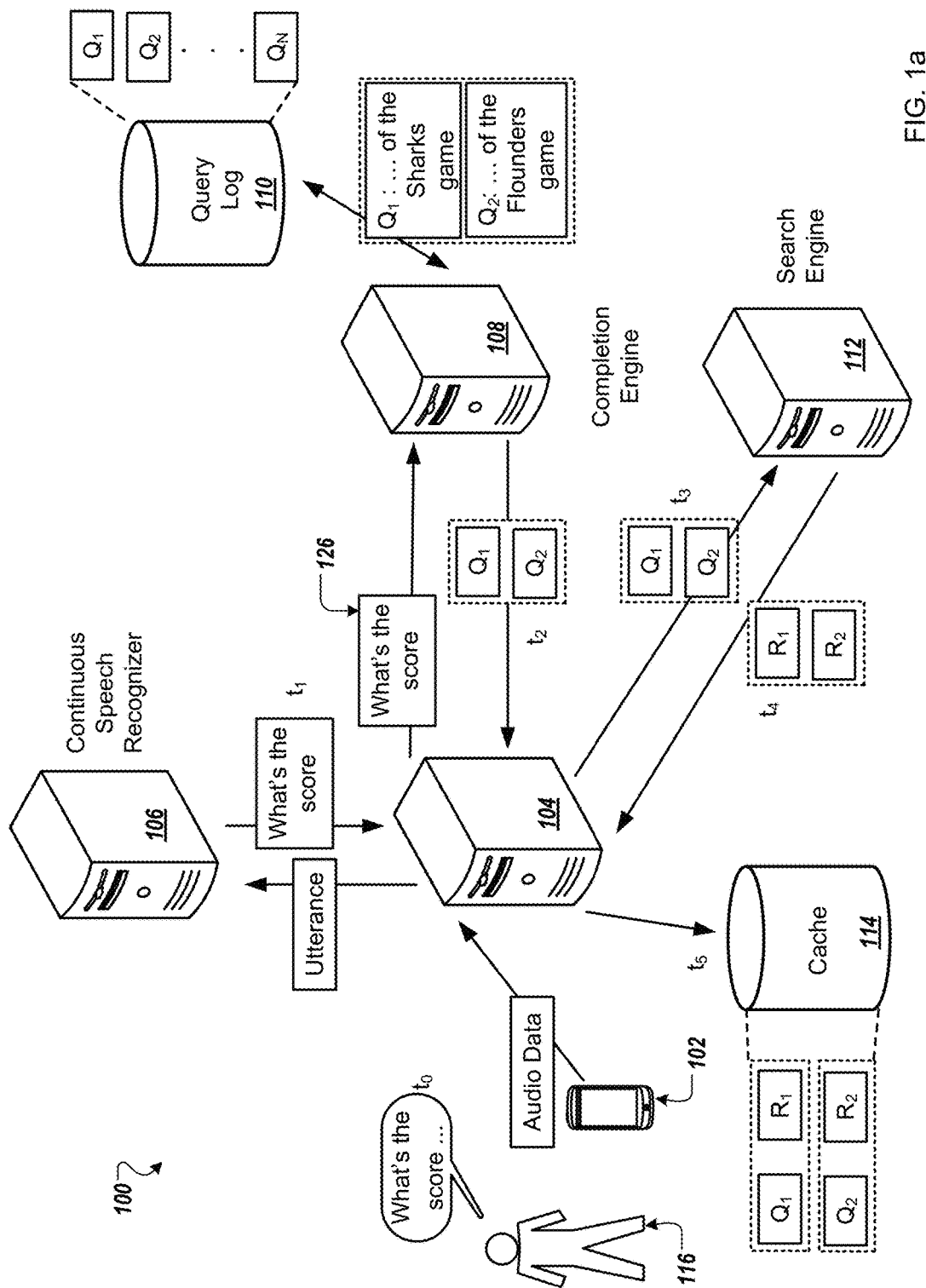
FIG. 1a depicts a system for obtaining search results based on an intermediate transcription of an utterance.

FIG. 1a depicts a system 100 for obtaining search results based on an intermediate transcription of an utterance. Briefly, the system 100 can obtain an intermediate transcription of an utterance, and before a final transcription of the utterance is obtained, determine that the intermediate transcription is associated with a previously received search query and obtain results that are responsive to the previously received search query. The system 100 includes a mobile computing device 102, a frontend engine 104, a continuous speech recognizer 106, a completion engine 108, a query log 110, a search engine 112, and a cache 114. In some examples, one or more of the continuous speech recognizer 106, the completion engine 108, and the search engine 112 may be included by the frontend engine 104. The mobile computing device 102 is in communication with the frontend engine 104 over one or more networks. The mobile computing device 102 can include a microphone, a camera, or other detection means for detecting utterances from a user 116.

In some examples, the user 116 wants to know the score of the game that his favorite team is playing. Therefore, the user 116 may ask a question, e.g., a spoken natural language query, for such a score. However, prior to providing, i.e., completing the question or providing the full question, the mobile computing device 102 detects an utterance of an initial portion of the question. In the illustrated example, prior to completing the question by the user 116, the mobile computing device 102 detects the initial portion of the question, e.g., "What's the score," as the utterance at a time $t_0$ prior to the user 116 providing the full question.

In some examples, the utterance can include a voice command other than a voice query. For example, the voice command can include a "hotword," e.g., an "attention word" or a "voice action initiation command," that is a predetermined term that is spoken to invoke the attention of the system 100.

The frontend engine 104 receives audio data encoding the utterance from the mobile computing device 102, e.g., over one or more networks. In some examples, the audio data can further include environmental data, including location data of the mobile computing device 102. The frontend engine 104 can appropriately process the audio data, including extracting the utterance from the audio data, and provide the utterance to the continuous speech recognizer 106.

The continuous speech recognizer 106 generates an intermediate transcription of the utterance. Generating the intermediate transcription of the utterance can include the continuous speech recognizer 106 transcribing the utterance into text or text-related data. In some examples, the continuous speech recognizer 106 can provide a representation of language in written form of the utterance. For example, the continuous speech recognizer 106 transcribes the utterance to generate the transcription of "What's the score." The continuous speech recognizer 106 provides the intermediate transcription to the frontend engine 104.

The frontend engine 104 obtains the intermediate transcription of the utterance from the continuous speech recognizer 106 at time $t_1$. The frontend engine 104 can appropriately process the intermediate transcription, and provide the intermediate transcription to the completion engine 108. To that end, in the illustrated example, the completion engine 108 receives the intermediate transcription "What's the score," and prior to obtaining a final transcription of the utterance, e.g., by the frontend engine 104 and/or the continuous speech recognizer 106, appropriately processes the intermediate transcription of the utterance, as described below.

Specifically, the completion engine 108 determines that the intermediate transcription of the utterance is associated with a previously received search query. In the illustrated example, the completion engine 108 accesses the query log 110 that includes previously received search queries, shown as queries $Q_1, Q_2, \ldots, Q_N$. The completion engine 108 determines that the intermediate transcription "What's the score" of the utterance is associated with the previously received search query $Q_1$, "What's the score of the Sharks game" and is also associated with the previously received search query $Q_2$, "What's the score of the Flounders game."

In some examples, the completion engine 108 determines that the intermediate transcription of the utterance is identical to a portion of the previously received search query. Specifically, the completion engine 108 determines that the intermediate transcription of the utterance is identical, e.g., matches or is the same as, to an initial portion, or a prefix, of the previously received search query. In the illustrated example, the completion engine 108 determines that the intermediate transcription "What's the score" of the utterance is identical to an initial portion of the previously received search query $Q_1$ "What's the score of the Sharks game" and identical to an initial portion of the previously received search query $Q_2$ "What's the score of the Flounders game."

In some examples, the completion engine 108 determines that the intermediate transcription of the utterance is within a threshold similarity or within a predetermined edit distance of a portion of the previously received search query. Specifically, the completion engine 108 determines that the intermediate transcription of the utterance is within a threshold similarity to an initial portion, or a prefix, of the previously received search query. For example, the completion engine 108 can determine that the intermediate transcription "What's the score" of the utterance is within a threshold similarity to an initial portion of the previously received search query "What is the score of the Sharks game." The completion engine 108 determines that the intermediate transcription "What's the score" of the utterance is within a threshold similarity to the initial portion of "What is the score" of the previously received search query. In some examples, the threshold similarity is based on an edit distance between the intermediate transcription of the utterance and the portion, e.g., initial portion, of the previously received search query.

In some examples, the completion engine 108 determines that the intermediate transcription of the utterance is associated with the previously received search query only after determining that the intermediate transcription of the utterance is of a threshold size or length. The completion engine 108 compares the intermediate transcription of the utterance with a threshold size, and in response to the intermediate transcription of the utterance being at least a threshold size, determines that the intermediate transcription of the utterance is associated with a previously received search query. For example, the completion engine 108 can compare an intermediate transcription "What's the score" of the utterance with a threshold size, and in response, determine that the intermediate transcription "What's the score" of the utterance is associated with the previously received search query $Q_1$ "What's the score of the Sharks game" and is also associated with previously received search query $Q_2$ "What's the score of the Flounders game." In some examples, the threshold size is based on a threshold number of phonemes, syllables, or words.

In some examples, the completion engine 108 determines that a location associated with the utterance is associated with a location associated with the previously received search query. Specifically, the frontend engine 104 can provide the location associated with the utterance, as provided by the audio data from the mobile computing device 102, to the completion engine 108. The completion engine 108 can further determine that the intermediate transcription of the utterance is associated with the previously received search query based on determining that the location associated with the utterance is associated with the location associated with the previously received search query. In some examples, the completion engine 108 can determine that the intermediate transcription of the utterance is associated with a previously received search query, and further that the location associated with the utterance is associated with the location associated with the previously received search query. For example, in the illustrated example, the utterance provided by the user 116 at time $t_0$ can be associated with a home-location of the user 116. The completion engine 108 can determine that one or both of the previously received search queries $Q_1$ and $Q_2$ are also associated with the home-location.

In some examples, the completion engine 108 determines that the intermediate transcription of the utterance is associated with a previously received search query that was submitted by the user 116. Specifically, the previously received search query was submitted by the same user, e.g., the user 116 that is associated with the utterance. Thus, the completion engine 108 can further determine that the intermediate transcription of the utterance is associated with the previously received search query based on determining that the utterance and the previously received search query are associated with the same user, e.g., the user 116. For example, in the illustrated example, the utterance and the previously received search queries $Q_1$ and $Q_2$ are both associated with the user 116.

In some examples, the completion engine 108 determines that the intermediate transcription of the utterance is associated with a previously received search query that was submitted by a different user than the user 116. Specifically, the previously received search query was submitted by a different user than the user 116 that is associate with the utterance. Thus, the completion engine 108 can further determine that the intermediate transcription of the utterance is associated with the previously received search query based on determining that the utterance and the previously received search query are associated with different users.

The completion engine 108 provides the previously received search queries $Q_1$ and $Q_2$ to the frontend engine 104 at time $t_2$. The frontend engine 104 obtains results that are identified as responsive to the previously received search queries $Q_1$ and $Q_2$. Specifically, the frontend engine 104 provides the previously received search queries $Q_1$ and $Q_2$ to the search engine 112 for re-execution by the search engine 112 at time $t_3$. The search engine 112 conducts a search of electronic documents for each of the queries $Q_1$ and $Q_2$ to identify results $R_1$ and $R_2$ that are responsive to the queries $Q_1$ and $Q_2$, respectively. The search engine 112 provides the results $R_1$ and $R_2$ to the frontend engine 104 at time $t_4$. The frontend engine 104 stores the results $R_1$ and $R_2$ in the cache 114 at time $t_5$. Specifically, in the illustrated example, the frontend engine 104 stores the query $Q_1$, the result $R_1$, and the association between the query $Q_1$ and the result $R_1$ in the cache 114, and further stores the query $Q_2$, the result $R_2$, and the association between the query $Q_2$ and the result $R_2$ in the cache 114.

Figure 1B:
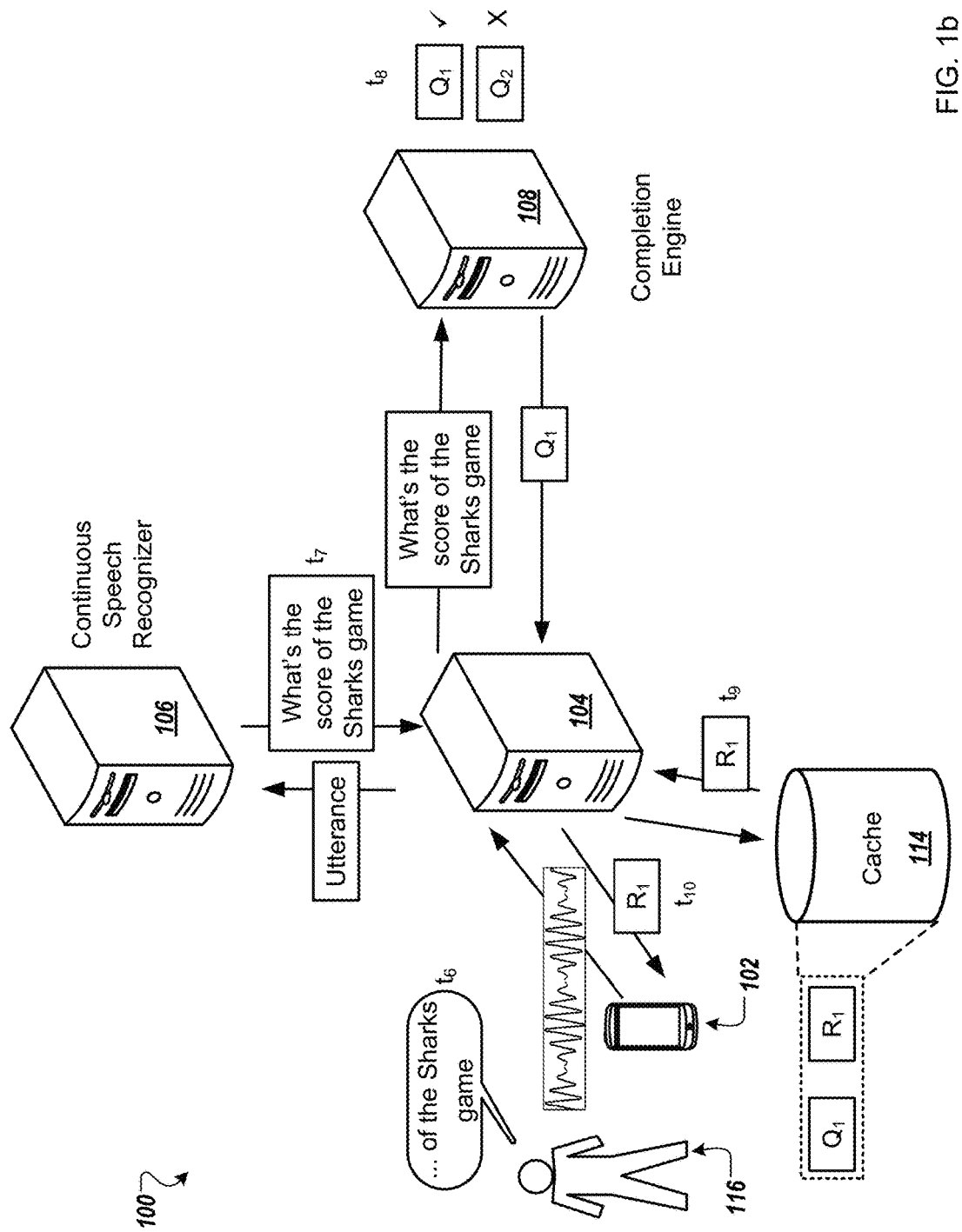
FIG. 1b depicts the system for providing search results for a final transcription of the utterance.

FIG. 1b illustrates the system 100 for providing search results for a final transcription of the utterance. Briefly, the system 100 can further obtain the final transcription of the utterance, determine that the final transcription of the utterance is also associated with the previously received search query, and provide the previously stored results for output.

In some examples, the user 116 completes the question, i.e., provides the full question that was initially provided at time $t_0$. In the illustrated example, the mobile computing device 102 detects an utterance of the final portion of the question, e.g., "of the Sharks game," at the time $t_6$. In some examples, the time $t_6$ can occur between times $t_2$ and $t_5$. The system 100 can begin processing of the initial portion "What's the score" of the utterance, i.e., obtain an intermediate transcription of an utterance, determine that the intermediate transcription is associated with a previously received search query, and/or obtain results that are responsive to the previously received search query, prior to and/or concurrently with detecting the utterance of the final portion of the question, e.g., "of the Sharks game."

The frontend engine 104 receives audio data encoding the utterance from the mobile computing device 102, e.g., over one or more networks. The frontend engine 104 can appropriately process the audio data, including extracting the utterance from the audio data, and provide the utterance to the continuous speech recognizer 106. In some examples, the frontend engine 104 provides the full utterance "What's the score of the Sharks game" to the continuous speech recognizer 106. In some examples, the frontend engine 104 provides the remaining portion of the utterance "of the Sharks game" to the continuous speech recognizer 106.

The continuous speech recognizer 106 generates a final transcription of the utterance. Generating the final transcription of the utterance can include the continuous speech recognizer 106 transcribing the utterance into text or text-related data. In some examples, the continuous speech recognizer 106 can provide a representation of language in written form of the utterance. For example, the continuous speech recognizer 106 transcribes the entire utterance to generate the final transcription of "What's the score of the Sharks game." The continuous speech recognizer 106 provides the final transcription to the frontend engine 104.

The frontend engine 104 obtains the final transcription from the continuous speech recognizer 106 at time $t_7$. The frontend engine 104 can appropriately process the final transcription, and provide the final transcription to the completion engine 108. To that end, in the illustrated example, the completion engine 108 receives the final transcription "What's the score of the Sharks game" and appropriately processes the final transcription of the utterance, as described below.

In some implementations, the completion engine 108 determines that the final transcription of the utterance is also associated with the previously received search query at time $t_8$. Specifically, the completion engine 108 accesses the previously received search queries $Q_1$ and $Q_2$ that were identified as being associated with the intermediate transcription of the utterance. In some examples, the completion engine 108 compares the final transcription of the utterance with each of the previously received search queries $Q_1$ and $Q_2$. The completion engine 108 determines that the final transcription "What's the score of the Sharks game" is associated with the previously received search query $Q_1$ "What's the score of the Sharks game." Further, in some examples, the completion engine 108 determines that the final transcription "What's the score of the Sharks game" is not associated with the previously received search query $Q_2$ of "What's the score of the Flounders game."

In some examples, the completion engine 108 determines that the final transcription of the utterance is identical to the previously received search query. The completion engine 108 determines that the final transcription of the utterance is similar or identical, e.g., matches or is the same as or similar to, to the previously received search query. In the illustrated example, the completion engine 108 determines that the final transcription "What's the score of the Sharks game" of the utterance is identical to the previously received search query $Q_1$ "What's the score of the Sharks game."

In some examples, the completion engine 108 determines that the final transcription of the utterance is within a threshold similarity to the previously received search query. The completion engine 108 determines that the final transcription of the utterance is within a threshold similarity to the previously received search query. For example, the completion engine 108 can determine that the final transcription "What's the score of the Sharks game" of the utterance is within a threshold similarity to a previously received search query "What is the score of the Sharks game." The completion engine 108 determines that the final transcription "What's the score of the Sharks game" of the utterance is within a threshold similarity to "What is the score of the Sharks game" of the previously received search query. In some examples, the threshold similarity is based on an edit distance between the final transcription of the utterance and the previously received search query.

The completion engine 108 provides the previously received search query $Q_1$ to the frontend engine 104, or an indication of the previously received search query $Q_1$ to the frontend engine 104. The frontend engine 104 accesses the cache 114 to identify a respective result that is associated with the previously received search query $Q_1$. Specifically, the frontend engine 104 identifies an association between the previously received search query $Q_1$ and the result $R_1$, as stored by the cache 114, and receives the result $R_1$ at time $t_9$. In some examples, in response to identifying the association between the previously received search query $Q_1$ and the result $R_1$, the frontend engine 104 removes from the cache 114 the query $Q_2$, the result $R_2$, and the association between the query $Q_2$ and the result $R_2$.

The completion engine 108 provides the stored result $R_1$ for output to the mobile computing device 102 at time $t_{10}$. In response to the completion engine 108 determining that the final transcription "What's the score of the Sharks game" of the utterance is also associated with the previously received search query $Q_1$, the frontend engine 104 provides the stored result $R_1$ for output to the mobile computing device 102.

Figure 2:
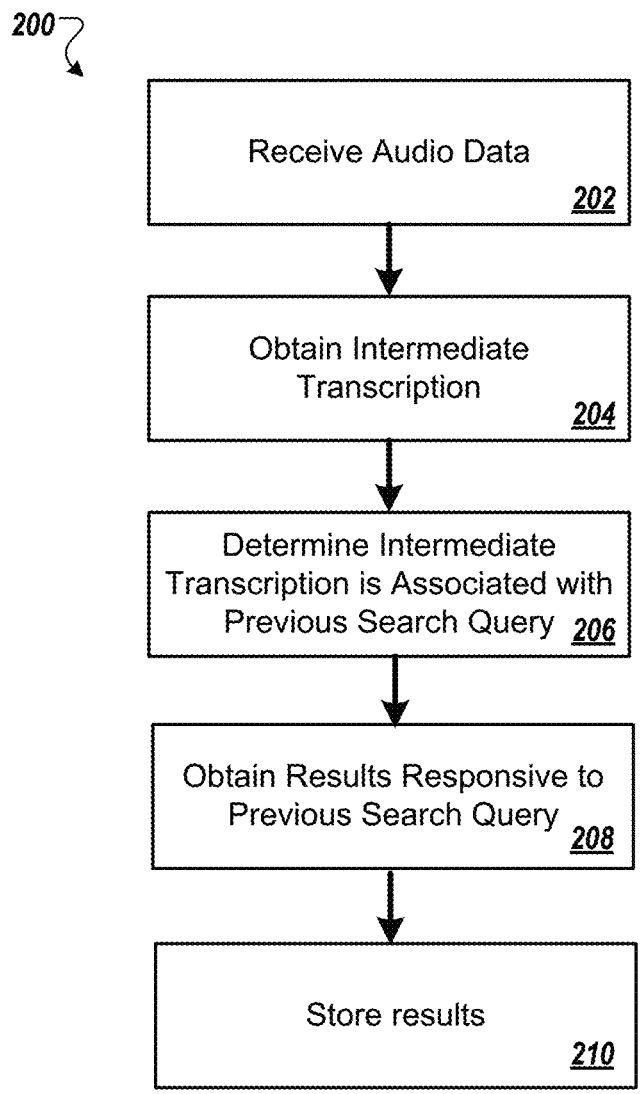
FIG. 2 depicts a flowchart of an example process for obtaining search results based on the intermediate transcription of the utterance.

FIG. 2 depicts a flowchart of an example process 200 for obtaining search results based on an intermediate transcription of an utterance. The example process 200 can be executed using one or more computing devices. For example, the mobile computing device 102, the frontend engine 104, the continuous speech recognizer 106, the completion engine 108, and/or the search engine 112 can be used to execute the example process 200.

Audio data that encodes an utterance is received (202). Specifically, the frontend engine 104 receives the audio data from the mobile computing device 102. For example, the audio data includes the initial portion of the utterance, e.g., "Book a flight to."

An intermediate transcription of the utterance is obtained (204). Specifically, the continuous speech recognizer 106 generates an intermediate transcription of the utterance. For example, the continuous speech recognizer 106 transcribes the utterance to generate the transcription of "Book a flight to." The frontend engine 104 obtains the intermediate transcription of the utterance from the continuous speech recognizer 106.

The intermediate transcription of the utterance is determined to be associated with a previously received search query (206). Specifically, before obtaining a final transcription of the utterance, the completion engine 108 determines that the intermediate transcription of the utterance is associated with a previously received search query. For example, the completion engine 108 determines that the intermediate transcription "Book a flight to" of the utterance is associated with a previously received search query $Q_A$ "Book a flight to Austin" and is also associated with a previously received search query $Q_B$ "Book a flight to Mexico."

Results are obtained that are responsive to the previously received search query (208). Specifically, before obtaining a final transcription of the utterance, the search engine 112 executes the previously received search queries to identify results that are responsive to the previously received search queries. For example, the search engine 112 conducts a search of electronic documents for each of the queries $Q_A$ and $Q_B$ to identify results $R_A$ and $R_B$ that are responsive to the queries $Q_A$ and $Q_B$, respectively. The frontend engine 104 obtains the results $R_A$ and $R_B$ from the search engine.

The results are stored (210). Specifically, before obtaining a final transcription of the utterance, the frontend engine 104 stores the results in a cache. For example, the frontend engine 104 stores the query $Q_A$, the result $R_A$, and the association between the query $Q_A$ and the result $R_A$ in the cache 114, and further stores the query $Q_B$, the result $R_B$, and the association between the query $Q_B$ and the result $R_B$ in the cache 114.

Figure 3:
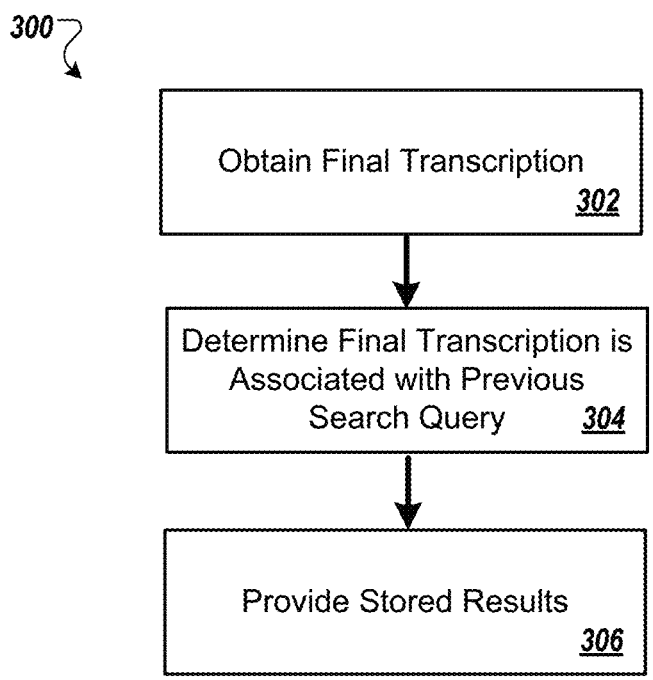
FIG. 3 depicts a flowchart of an example process for providing search results for the final transcription of the utterance.

FIG. 3 depicts a flowchart of an example process 300 for providing search results for a final transcription of the utterance. The example process 300 can be executed using one or more computing devices. For example, the mobile computing device 102, the frontend engine 104, the continuous speech recognizer 106, the completion engine 108, and/or the search engine 112 can be used to execute the example process 300.

The final transcription of the utterance is obtained (302). Specifically, the continuous speech recognizer 106 generates the final transcription of the utterance. For example, the continuous speech recognizer 106 transcribes the entire utterance to generate the final transcription of "Book a flight to Austin." The frontend engine 104 obtains the final transcription of the utterance from the continuous speech recognizer 106.

The final transcription of the utterance is determined to also be associated with the previously received search query (304). Specifically, the completion engine 108 determines that the final transcription of the utterance is also associated with the previously received search query. For example, the completion engine 108 determines that the final transcription "Book a flight to Austin" is associated with the previously received search query $Q_A$ "Book a flight to Austin."

In response to determining that the final transcription of the utterance is also associated with the previously received search query, stored results are provided for output. Specifically, the frontend engine 104 accesses the cache 114 to identify a respective result that is associated with the previously received search query. In response to the completion engine 108 determining that the final transcription "Book a flight to Austin" of the utterance is also associated with the previously received search query $Q_A$, the frontend engine 104 provides the stored result $R_A$ for output to the mobile computing device 102.

Figure 4:
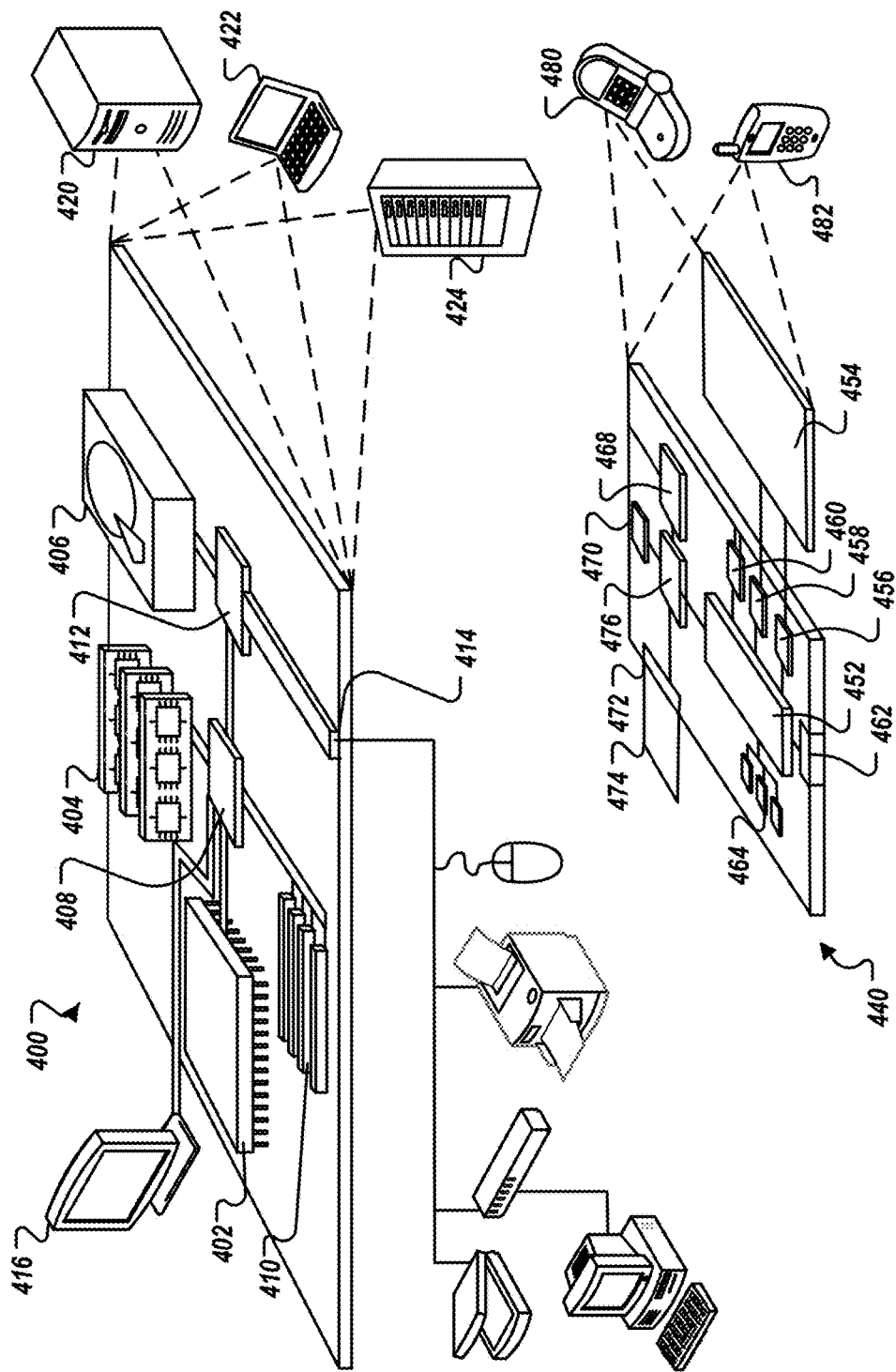
FIG. 4 depicts a computer device and a mobile computer device that may be used to implement the techniques described here.

FIG. 4 shows an example of a generic computer device 400 and a generic mobile computer device 440, which may be used with the techniques described here. Computing device 400 is intended to represent various forms of digital computers, such as laptops, desktops, workstations, personal digital assistants, servers, blade servers, mainframes, and other appropriate computers. Computing device 440 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, or a memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter. IN some examples, the storage device 406 is coupled to a high-speed bus.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 440. Each of such devices may contain one or more of computing device 400, 440, and an entire system may be made up of multiple computing devices 400, 440 communicating with each other.

Computing device 440 includes a processor 452, memory 464, an input/output device such as a display 454, a communication interface 476, and a transceiver 468, among other components. The device 440 may also be provided with a storage device, such as a microdrive or other device, to provide additional storage. Each of the components 440, 452, 464, 454, 476, and 468, are interconnected using various buses, and several of the components may be mounted on a common motherboard or in other manners as appropriate.

The processor 452 may execute instructions within the computing device 640, including instructions stored in the memory 464. The processor may be implemented as a chipset of chips that include separate and multiple analog and digital processors. The processor may provide, for example, for coordination of the other components of the device 440, such as control of user interfaces, applications run by device 440, and wireless communication by device 440.

Processor 452 may communicate with a user through control interface 468 and display interface 446 coupled to a display 454. The display 454 may be, for example, a TFT LCD (Thin-Film-Transistor Liquid Crystal Display) or an OLED (Organic Light Emitting Diode) display, or other appropriate display technology. The display interface 446 may comprise appropriate circuitry for driving the display 454 to present graphical and other information to a user. The control interface 448 may receive commands from a user and convert them for submission to the processor 452. In addition, an external interface 462 may be provide in communication with processor 452, so as to enable near area communication of device 440 with other devices. External interface 462 may provide, for example, for wired communication in some implementations, or for wireless communication in other implementations, and multiple interfaces may also be used.

The memory 464 stores information within the computing device 440. The memory 464 may be implemented as one or more of a computer-readable medium or media, a volatile memory unit or units, or a non-volatile memory unit or units. Expansion memory 444 may also be provided and connected to device 440 through expansion interface 442, which may include, for example, a SIMM (Single In Line Memory Module) card interface. Such expansion memory 444 may provide extra storage space for device 440, or may also store applications or other information for device 440. Specifically, expansion memory 444 may include instructions to carry out or supplement the processes described above, and may include secure information also. Thus, for example, expansion memory 444 may be provide as a security module for device 440, and may be programmed with instructions that permit secure use of device 440. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 444, memory on processor 452, or a propagated signal that may be received, for example, over transceiver 468 or external interface 462.

Device 440 may communicate wirelessly through communication interface 476, which may include digital signal processing circuitry where necessary. Communication interface 476 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 440 may provide additional navigation- and location-related wireless data to device 440, which may be used as appropriate by applications running on device 440.

Device 440 may also communicate audibly using audio codec 460, which may receive spoken information from a user and convert it to usable digital information. Audio codec 460 may likewise generate audible sound for a user, such as through a speaker, e.g., in a handset of device 440. Such sound may include sound from voice telephone calls, may include recorded sound (e.g., voice messages, music files, etc.) and may also include sound generated by applications operating on device 440.

The computing device 440 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A method comprising:
   receiving, from a digital assistant device or mobile device and by a front end-server of a query processing system that includes (i) the front-end server, (ii) a continuous speech recognizer, (iii) a completion engine, and (iv) a search engine, audio data encoding an utterance received at the digital assistant device or the mobile device;
   obtaining, by the continuous speech recognizer of the query processing system, an intermediate transcription of an initial portion of the utterance;
   before the continuous speech recognizer generates a final transcription of the entire utterance:
      i) determining, by the completion engine of the query processing system, that the intermediate transcription of the initial portion of the utterance is associated with a previously received search query,
      ii) obtaining, by the search engine of the query processing system, one or more results that are identified as responsive to the previously received search query, and
      iii) storing, by the front-end server of the query processing system, one or more of the results;
   obtaining, by the continuous speech recognizer of the query processing system, the final transcription of the entire utterance;
   determining, by the completion engine of the query processing system, that the final transcription of the entire utterance is also associated with the previously received search query; and
   in response to determining that the final transcription of the entire utterance is also associated with the previously received search query, providing, by the front-end server of the query processing system, the stored one or more results for output without submitting the final transcription of the entire utterance to the search engine.

2. The method of claim 1, further comprising determining, by the completion engine of the query processing system, that the intermediate transcription of the utterance is of a threshold size, wherein the intermediate transcription of the utterance is determined to be associated with the previously received search query only after determining that the intermediate transcription is of the threshold size.

3. The method of claim 1, further comprising after determining that the intermediate transcription of the initial portion of the utterance is associated with the previously received search query, submitting, by the front-end server of the query processing system, the previously received search query for re-execution by a search engine.

4. The method of claim 1, wherein the audio data further includes location data of the digital assistant device or the mobile device, wherein determining that the intermediate transcription of the initial portion of the utterance is associated with the previously received search query comprises determining, by the completion engine of the query processing system, that the location data is associated with a location associated with the previously received search query.

5. The method of claim 1, wherein determining that the intermediate transcription of the initial portion of the utterance is associated with the previously received search query comprises determining, by the completion engine of the query processing system, that the intermediate transcription of the utterance is associated with a previously received search query, the previously received search query submitted by a same user that provided the audio data encoding the utterance.

6. The method of claim 1, wherein determining that the intermediate transcription of the initial portion of the utterance is associated with the previously received search query comprises determining, by the completion engine of the query processing system, that the intermediate transcription of the utterance is associated with a previously received search query, the previously received search query submitted by a different user than a user that provided the audio data encoding the utterance.

7. The method of claim 1, wherein the utterance is a voice command.

8. The method of claim 1, wherein determining that the intermediate transcription of the initial portion of the utterance is associated with a previously received search query further comprises determining, by the completion engine of the query processing system, that the intermediate transcription of the utterance matches a prefix portion of the previously received search query.

9. The method of claim 1, wherein determining that the intermediate transcription of the initial portion of the utterance is associated with a previously received search query further comprises determining, by the completion engine of the query processing system, that the intermediate transcription of the utterance is within a predetermined edit distance of a prefix portion of the previously received search query.

10. A system comprising:
   one or more computers and one or more storage devices storing instructions that are operable, when executed by the one or more computers, to cause the one or more computers to perform operations comprising:
      receiving, from a digital assistant device or mobile device and by a front end-server of a query processing system that includes (i) the front-end server, (ii) a continuous speech recognizer, (iii) a completion engine, and (iv) a search engine, audio data encoding an utterance received at the digital assistant device or the mobile device;
      obtaining, by the continuous speech recognizer of the query processing system, an intermediate transcription of an initial portion of the utterance;
      before the continuous speech recognizer generates a final transcription of the entire utterance:
         i) determining, by the completion engine of the query processing system, that the intermediate transcription of the initial portion of the utterance is associated with a previously received search query,
         ii) obtaining, by the search engine of the query processing system, one or more results that are identified as responsive to the previously received search query, and
         iii) storing, by the front-end server of the query processing system, one or more of the results;
      obtaining, by the continuous speech recognizer of the query processing system, the final transcription of the entire utterance;
      determining, by the completion engine of the query processing system, that the final transcription of the entire utterance is also associated with the previously received search query; and
      in response to determining that the final transcription of the entire utterance is also associated with the previously received search query, providing, by the front-end server of the query processing system, the stored one or more results for output without submitting the final transcription of the entire utterance to the search engine.

11. The system of claim 10, the operations further comprising determining, by the completion engine of the query processing system, that the intermediate transcription of the utterance is of a threshold size, wherein the intermediate transcription of the utterance is determined to be associated with the previously received search query only after determining that the intermediate transcription is of the threshold size.

12. The system of claim 10, the operations further comprising after determining that the intermediate transcription of the initial portion of the utterance is associated with the previously received search query, submitting, by the front-end server of the query processing system, the previously received search query for re-execution by a search engine.

13. The system of claim 10, wherein the audio data further includes location data of the digital assistant device or the mobile device, wherein determining that the intermediate transcription of the initial portion of the utterance is associated with the previously received search query comprises determining, by the completion engine of the query processing system, that the location data is associated with a location associated with the previously received search query.

14. The system of claim 10, wherein determining that the intermediate transcription of the initial portion of the utterance is associated with the previously received search query comprises determining, by the completion engine of the query processing system, that the intermediate transcription of the utterance is associated with a previously received search query, the previously received search query submitted by a same user that provided the audio data encoding the utterance.

15. A non-transitory computer-readable medium storing software comprising instructions executable by one or more computers which, upon such execution, cause the one or more computers to perform operations comprising:

receiving, from a digital assistant device or mobile device and by a front end-server of a query processing system that includes (i) the front-end server, (ii) a continuous speech recognizer, (iii) a completion engine, and (iv) a search engine, audio data encoding an utterance received at the digital assistant device or the mobile device;

obtaining, by the continuous speech recognizer of the query processing system, an intermediate transcription of an initial portion of the utterance;

before the continuous speech recognizer generates a final transcription of the entire utterance:

i) determining, by the completion engine of the query processing system, that the intermediate transcription of the initial portion of the utterance is associated with a previously received search query, ii) obtaining, by the search engine of the query processing system, one or more results that are identified as responsive to the previously received search query, and iii) storing, by the front-end server of the query processing system, one or more of the results;

obtaining, by the continuous speech recognizer of the query processing system, the final transcription of the entire utterance;

determining, by the completion engine of the query processing system, that the final transcription of the entire utterance is also associated with the previously received search query; and in response to determining that the final transcription of the entire utterance is also associated with the previously received search query, providing, by the front-end server of the query processing system, the stored one or more results for output without submitting the final transcription of the entire utterance to the search engine.

16. The computer-readable medium of claim 15, the operations further comprising determining, by the completion engine of the query processing system, that the intermediate transcription of the utterance is of a threshold size, wherein the intermediate transcription of the utterance is determined to be associated with the previously received search query only after determining that the intermediate transcription is of the threshold size.

17. The computer-readable medium of claim 15, the operations further comprising after determining that the intermediate transcription of the initial portion of the utterance is associated with the previously received search query, submitting, by the front-end server of the query processing system, the previously received search query for re-execution by a search engine.

* * * * *

UNITED STATES PATENT AND TRADEMARK OFFICE
CERTIFICATE OF CORRECTION

| | | |
|---|---|---|
| PATENT NO. | : 10,133,821 B2 | Page 1 of 1 |
| APPLICATION NO. | : 14/988990 | |
| DATED | : November 20, 2018 | |
| INVENTOR(S) | : Tandiono et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 344 days.

Signed and Sealed this
Sixteenth Day of July, 2019

Andrei Iancu
*Director of the United States Patent and Trademark Office*